Fig. 2

United States Patent Office 3,510,515
Patented May 5, 1970

3,510,515
METHOD OF MAKING GLYCINE
Charles S. Colburn, Jr., Lookout Mountain, Tenn., assignor to Chattem Drug & Chemical Company, Chattanooga, Tenn., a corporation of Tennessee
Filed Jan. 4, 1967, Ser. No. 607,308
Int. Cl. C07c *101/06*
U.S. Cl. 260—534                                5 Claims

ABSTRACT OF THE DISCLOSURE

A continous or semibatch method of making glycine by ammonolysis of chloroacetic acid in the presence of hexamethylenetetramine (HMT) maintained at an effective level by recycling a portion of the mother liquor obtained by centrifuging the cooled reaction mass containing HMT, glycine and ammonium chloride, thereby effecting a saving in the use of HMT and also facilitating the adjustment of quantities and concentrations of reactants to constant values after the method has reached a stage of equilibrium.

---

Figure 1:
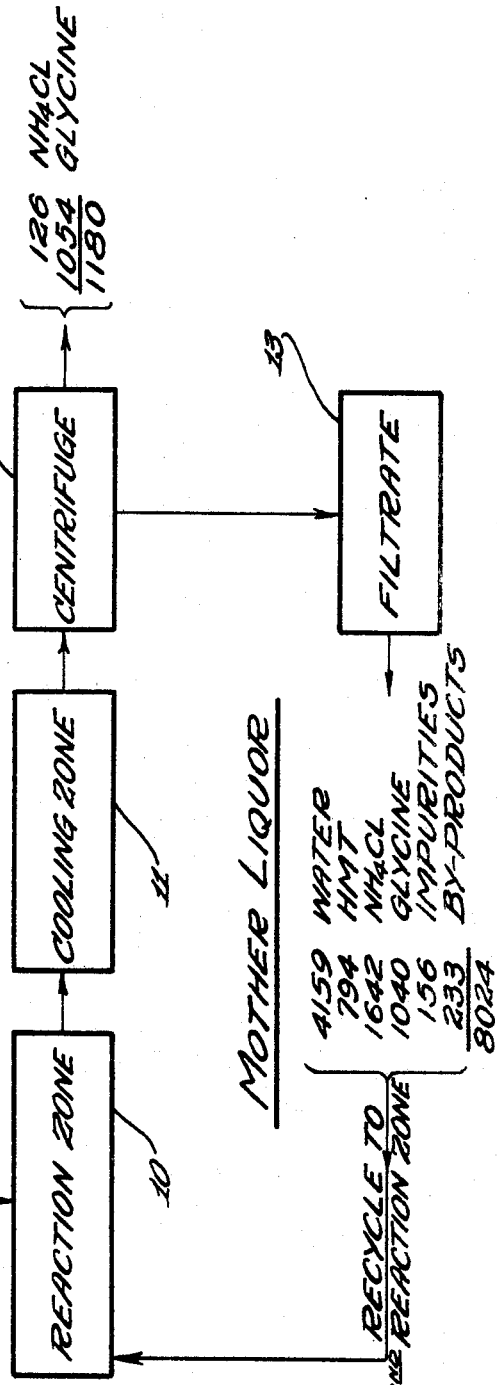

This invention relates to a method of making glycine, or aminoacetic acid, and constitutes an improvement over the method for the preparation of amino acids disclosed in the Guinot Pat. No. 3,215,736, dated Nov. 2, 1965.

As in said Guinot patent, the method of the present invention utilizes a monochloroacetic acid (MCA) moiety, either the free acid or an ammonium salt thereof, and effects its conversion by amination, or ammonolysis as it is referred to herein, by reaction with ammonia in the presence of a source of hexamethylenetetramine (HMT) in an effective but very small molal proportion to the chloroacetic acid. The conditions of carrying out the reaction are within the limits of proportions of reactants, levels of HMT/MCA, temperatures, times and pH values set forth in the Guinot patent, but the net amount of hexamethylenetetramine required for the production of a unit weight of glycine (100%) is considerably reduced.

This and other improvements are effected by carrying out the method either as a continuous or a semibatch method and recycling filtrate, or mother liquor, separated in one cycle for reuse in another cycle of the method to thereby effect both a saving in the overall amount of HMT required and a simplification of the Guinot process, while at the same time realizing an improved yield of glycine and/or a yield of glycine of higher purity.

In large measure such improvements are due to the recycling of mother liquor from one cycle to supplement a reaction mass for another cycle, thereby utilizing the HMT present in such mother liquor. It is then only necessary to add, as make-up, the additional amounts of HMT and reactants to bring together in their proper proportions and concentrations all of the reactants in the new reaction mass.

In addition to achieving a saving by such recycling, my invention makes possible a simplification by so controlling the concentration of the reactants in each reaction mass that upon cooling from the elevated temperature of the reaction, glycine and ammonium chloride precipitate out together in an admixture from which glycine can be easily recovered.

Where the term "centrifuge" or "centrifugation" is used, the term is intended to cover other techniques for separating solids from liquids, such as filtration.

An important object of my invention is to realize the improvements set forth above in the manufacture of glycine by a continuous process, but lesser benefits can also be realized if the reaction is carried out under the above outlined conditions as a semibatch process.

My method is illustrated in the attached drawings, wherein flow sheets with accompanying legends are shown and in which:

FIG. 1 is a glycine flow sheet representing the carrying out of an initial, or single batch reaction; and FIG. 2 is a glycine flow sheet representing a continuous process carried out at a stage where equilibrium has been reached as to quantities of fresh reactants in the make-up and quantities of reactants in the mother liquor recycled to the reaction zone to form a complete new reaction mass. FIG. 2 may also represent a semibatch process in whch an initial charge of recycled mother liquor is added to the reactor followed by addition of the other reactants.

As shown on the drawings:

In the glycine flow sheet of FIG. 1, the quantities of water, HMT, MCA, MCA impurities and 30% aqueous ammonia, shown as being charged into the reaction zone 10 are expressed in parts by weight in proper proportions for making up an initial reaction mass. The quantities shown are, of course, merely illustrative, but the HMT/MCA ratio is typically within the range described and claimed in the above mentioned Guinot patent for the making of glycine under the conditions of time, temperature, pH, etc., given in said patent. All of the quantities shown in FIG. 1 are in proper relation to one another for the carrying out of my improved process. An aqueous solution of ammonia (30% $NH_3$) supplies the necessary amount of $NH_3$ and also part of the total water required.

In the reaction zone 10, the reaction is carried out at a pH of between about 6.0 and 7.5 and at a temperature within the range of about 70–85° C., and preferably at about 75° C., while the reaction is going on. The concentration of glycine and ammonium chloride at the completion of the reaction is such that, upon cooling, the glycine and ammonium chloride precipitate out together.

Such cooling is effected in the cooling zone 11, into which the entire reaction mass is transferred from the reaction zone 10. In the cooling zone 11, the reaction mass is cooled to about 25° C. This particular temperature is not critical but is entirely satisfactory for commercial reasons and also for accomplishing the economies of my method. The quantities shown later on in the flow sheet are typical of those that are obtained where the cooling is effected at 25° C. and where the quantities charged to the reaction zone are as shown, or in the same proportions as shown.

From the cooling zone 11 the entire cooled mass is run into a centrifuge 12. The cake formed by centrifuging and having the composition indicated on FIG. 1 is transferred to vessels (not shown) wherein a purification step is carried out to obtain glycine in the desired state of purity, and ammonium chloride ($NH_4Cl$) is recovered.

The filtrate from the centrifuge 12 is discharged into a filtrate vessel 13 and has the composition shown in parts by weight, to wit:

Water ------------------------------------- 4159
HMT -------------------------------------- 794
$NH_4Cl$ ----------------------------------- 1642
Glycine ----------------------------------- 1040
Impurities -------------------------------- 156
By-products ------------------------------- 233

From the vessel 13, the filtrate is recycled to the reaction zone 10, where a second reaction is carried out, with whatever make-up of fresh reactants, etc. may be required to give the proper proportions of reactants in the proper concentrations.

This leads to an explanation of the glycine flow sheet at a stage of equilibrium such as shown in FIG. 2. By the term "at a stage of equilibrium" is meant the stage reached after a sufficient number of cycles, usually two or more, have been carried out, with accompanying recycling of the mother liquor, so that the same quantities of make-up and the same quantities of recycled components are sufficient to give, when combined, the same proportions and concentrations of the reactants in each successive reaction mass. In order to accomplish this result, approximately the same quantities and compositions of cake and of filtrate from the centrifuging step are removed from the flow through the system before recycling the remaining portion of the filtrate that is required for a subsequent reaction mass.

In FIG. 2, the similar zones and pieces of equipment are given the same reference numerals as in FIG. 1. As indicated by the legend ahead of the reaction zone 10, "Add to Reaction Zone in one unit time," the quantities of water, HMT, MCA, MCA impurities and anhydrous $NH_3$ shown are added to the reaction zone 10 in generally the same time unit at the beginning of each new cycle of the method. Within the same time unit the fresh make-up components are added, there is recycled into the reaction zone 10 a composition from the filtrate zone 13 that is designated as "Recycled Mother Liquor" and that is made up of the parts by weight of water, HMT, $NH_4Cl$, Glycine, Impurities and By-Products shown in FIG. 2. Together with the composition of the "Make-Up," the composition of the "Recycled Mother Liquor" provides the proper composition of the reaction mass within the reaction zone 10.

The same reaction conditions are maintained within said reaction zone as were previously given herein, followed by cooling of the reaction mass in the cooling zone 11 and centrifuging the cooled reaction mass in the centrifuge zone 12. The "Cake for Purification" from zone 12, having the composition of $NH_4Cl$ and glycine shown in FIG. 2, is mixed with the composition designated as "Mother Liquor for Purification Step" and sent in the form of a slurry to a vessel, or vessels, 14, identified by the legend "Slurry for Purification." There, the slurry is processed to obtain glycine of the desired purity. Such purification can be effected by separating the glycine from the ammonium chloride by the use of a water miscible solvent such as an aqueous methanol solution, in which the glycine is substantially insoluble and the ammonium chloride is substantially soluble, followed later by a recrystallization of the glycine from an aqueous solution thereof. A somewhat different method is described in said Guinot patent, since in the Guinot process, precipitation of glycine from a solution of glycine and ammonium chloride is there effected by the use of a water miscible solvent in which the glycine is insoluble. Here, cooling is relied upon to effect a co-precipitate of glycine and ammonium chloride and separation of the glycine is effected by dissolving ammonium chloride selectively and filtering off the glycine.

With regard now to the start of the cycle shown in FIG. 2, it can be calculated from the compositions of the "Make-Up" and "Recycled Mother Liquor" that the composite thereof going to the reaction zone 10 has the following ingredients in the parts by weight indicated:

Water _____ 4941
MCA _____ 2930
HMT _____ 794
$NH_3$ (Anhyd.) _____ 1126

The analysis of this composite shows the reactants, MCA and $NH_3$, to be in the same reacting proportions and concentrations, and the HMT to be at the same level for the efficient carrying out of the continuous process of FIG. 2 as for carrying out the single batch process of FIG. 1. Actually, it may be necessary to slightly adjust the quantities of some of the components in the "Make-Up" from time to time, but by the removal of an appropriate quantity of the "Mother Liquor for Purification Step," the composition of the "Recycled Mother Liquor" can be kept constant, once the continuous system has reached equilibrium, so that the composition of the "Make-Up" can also be kept constant.

A significant feature of my continuous process is that only 149 parts by weight of HMT is taken out in each cycle with 782 parts of water in the "Mother Liquor for Purification Step" so that only 149 parts of fresh HMT need be added in the Make-Up along with 782 parts of water, instead of 794 parts of HMT with 4941 parts of water, as in the single bath process. This represents a saving in HMT, since only 782/4941, or 15.8% as much HMT is required for maintaining the desired concentration in each cycle as is required in the single batch process with no recycling.

In the continuous or semibatch process of FIG. 2, in order that no water be introduced with the ammonia, anhydrous ammonia in gaseous state is used for introduction into the reaction zone 10 along with the other components of the "Make-up." Such use of anhydrous ammonia makes possible an easy control of the amount of make-up water required. In fact, if a 75% aqueous solution of MCA is used as the source of the 2930 parts of MCA shown in the "Make-Up", 20 parts of water are available to furnish the 782 parts of water. The balance, 5%, represents the impurities in the MCA and is shown as amounting to 195 parts of impurities by weight. By this procedure, the water included in the "Make-up" is kept small and constant in amount.

Still referring to FIG. 2, the amount of chloride in the cake from the centrifuge 12 that goes to purification, plus the amount of chloride in the filtrate portion labeled "Mother Liquor for Purification Step," is equal to the amount of chloride introduced into the reaction zone 10 from MCA and its impurities. Said amount of chloride will remain constant in each cycle after the first, or second cycle, viz, after the process reaches the equilibrium stage. This amount of chloride is calculated as $NH_4Cl$ and so shown in FIG. 2. An additional amount of $NH_4Cl$ is in the "Recycled Mother Liquor," and that amount is also calculated and shown in FIG. 2.

In the operation carried out in the centrifuge 12, centrifuging of the cooled reaction mass is preferably so controlled as to leave less than 10% of the mother liquor adhering to the solids that constitute the cake. The amount of glycine in the cake, viz, 2094 parts by weight as shown in FIG. 2, represents a 90% yield of the theoretical amount based upon the MCA used in the reaction.

Preferably, monochloroacetic acid of a technical grade is used for making glycine by the method of my invention, but the ammonium salt can be used. In that case the amount of ammonia used in the make-up is correspondingly reduced. Otherwise, the process remains essentially the same. A typical solution of technical grade monochloroacetic acid contains 75% MCA, 2% dichloroacetic acid, 2% acetic acid, 1% other impurities and 20% water.

Where HMT is referred to a technical grade should be understood to be meant.

By way of example, and on the basis of a series of reactions using 31 moles MCA per each reaction, the following procedure is illustrative:

(1) A first reaction is made to prepare a mother liquor. It differs from later reactions in that:

(a) Aqueous ammonia is used rather than anhydrous so that a desirable amount of water may be provided for the reaction mother liquor.

(b) A relative large amount of HMT is used compared to the small "make up" required later.

(c) Nearly all of the ammonium chloride formed will be dissolved in the reaction mother liquor and thus the ratio of glycine to ammonium chloride in the precipitate will be different.

1ST REACTION

React within Guinot conditions of pH, temperature, time, and HMT concentration.

| | Parts by weight |
|---|---|
| 5.67 moles HMT at 140.12 mol. wt. | 794 |
| Water | 750 |
| Total HMT Soln. | 1544 |
| 31 moles MCA at 94.50 mol. wt. | 2930 |
| Impurities (Equiv. to 2.06 moles MCA at 94.50 mol. wt. | 195 |
| Water | 782 |
| Total MCA Soln. | 3907 |
| 66.1 moles ammonia at 17.03 mol. wt. | 1126 |
| 70% water | 2627 |
| Total aqueous ammonia | 3753 |
| Grand total in | 9204 |
| Total water=4159 | |

Theoretical composition of reaction liquor prior to filtration

| | |
|---|---|
| 31 moles glycine | 2327 |
| 33.05 moles $NH_4Cl$ | 1768 |
| HMT | 794 |
| $H_2O$ | 4159 |
| MCA impurities | 156 |
| | 9204 |

Cool to 25° C.

The solubilities of ammonium chloride and glycine in the reaction mixture are not much different than they would be in water and a graph of their solubilities in water may be used for estimating their solubility in the reaction mixture.

It is important as a practical matter to cool to the same temperature in each cycle so that calculations to allow for different solubilities will be obviated.

Centrifuge (so that less than 10% of the mother liquor adheres to the solids). The filtrate becomes mother liquor for subsequent reactions. The filtrate is used as the starting mother liquor for following reactions. After filtering each reaction, the mother liquor is adjusted by removing a portion of it so that it has the same quantity of water present as when it started. In this example, it means removing enough of the solution to remove the 782 water added in the MCA solution and leave 4159 water. Impurities gradually build up in mother liquor until the amount removed with the 782 water is equal to the amount added.

After a few reactions to achieve equilibrium, the following material balance could be drawn when 90% of MCA is converted to glycine in each reaction.

INTO THE REACTION

| | From mother liquor | By addition | Total |
|---|---|---|---|
| Water | 4,159 | 782 | 4,941 |
| MCA | | [1] 2,930 | 2,930 |
| MCA impurities | 1,036 | 195 | 1,231 |
| HMT | 794 | 149 | [2] 943 |
| Anhyd. $NH_3$ | | 1,126 | 1,126 |
| $NH_4Cl$ | 1,642 | | 1,642 |
| Glycine | 1,040 | | 1,040 |
| 10% by-products | 1,236 | | 1,236 |
| | 9,907 | 5,182 | 15,084 |

6.73/31=.217 moles HMT/Mole MCA.

[1] 31 mol.
[2] 6.73 Mol.

OUT OF THE REACTION

| | As mother liquor | For purification | Total |
|---|---|---|---|
| Water | 4,159 | 782 | 4,941 |
| MCA impurities | 1,036 | 156 | 1,192 |
| HMT | 794 | 149 | 943 |
| $NH_4Cl$ | 1,642 | 1,768 | 3,410 |
| Glycine | 1,040 | [1] 2,094 | 3,134 |
| By-products | 1,236 | [2] 233 | 1,469 |
| | 9,907 | 5,182 | 15,089 |

[1] 2,327 x .9 (90% yield).
[2] 2,327 x 1.

It will be understood that modifications and variations may be effected without departing from the scope of the novel concepts of the present invention.

I claim:

1. In a process for the preparation of glycine by ammonolysis of a monochloroacetic acid moiety in an aqueous medium by means of ammonia in the presence of a hexamethylene-tetramine source wherein a reaction mass is obtained containing an aqueous solution of hexamethylenetetramine, glycine and ammonium chloride, the improvement comprising cooling said reaction mass sufficiently to effect co-crystallization of glycine and ammonium chloride, separating the aqueous phase containing hexamethylenetetramine from the solid phase resulting from said co-crystallization, recycling aqueous phase containing hexamethylenetetramine for use in the preparation of additional quantities of glycine, and recovering glycine from the solid phase by selectively solubilizing the ammonium chloride.

2. The process as defined by claim 1, wherein the amount of said aqueous phase recycled is adjusted to maintain the proportion of water in said ammonolysis reaction mass substantially constant.

3. The method in accordance with claim 2 in which fresh water and hexamethylenetetramine are mixed with said recycled phase for preparation of additional quantities of glycine.

4. The process as defined by claim 3 in which the recycled aqueous phase constitutes the major portion of the water and hexamethylenetetramine in the reaction mixture.

5. The process as defined by claim 4, wherein the process is carried out as a continuous process, the ammonolysis is carried out at a temperature of between about 70–85° C. and at pH of between about 6.0 and 7.5, and the ammonolysis reaction mass is cooled to about 25° C. to effect said co-crystallization.

References Cited

UNITED STATES PATENTS

| | | | |
|---|---|---|---|
| 3,190,914 | 6/1965 | Williams | 260—534 |
| 3,215,736 | 11/1965 | Guinot | 260—534 |
| 3,244,733 | 4/1966 | Wakasa et al. | 260—534 XR |

LORRAINE A. WEINBERGER, Primary Examiner

P. J. KILLOS, Assistant Examiner

UNITED STATES PATENT OFFICE
CERTIFICATE OF CORRECTION

Patent No. 3,510,515        Dated May 5, 1970

Inventor(s) Charles S. Colburn, Jr.

It is certified that error appears in the above-identified patent and that said Letters Patent are hereby corrected as shown below:

Col. 6, line 12  "2,327 x 1." should be --2,327 x .1--.

SIGNED AND
SEALED
OCT 27 1970

(SEAL)
Attest:

Edward M. Fletcher, Jr.
Attesting Officer

WILLIAM E. SCHUYLER, JR.
Commissioner of Patents